US012637306B2

(12) United States Patent
Takaishi

(10) Patent No.: US 12,637,306 B2
(45) Date of Patent: May 26, 2026

(54) RIGHT ANGLE TRANSFER DEVICE

(71) Applicant: KYOWA MANUFACTURING CO., LTD., Hyogo (JP)

(72) Inventor: Suguru Takaishi, Hyogo (JP)

(73) Assignee: KYOWA MANUFACTURING CO., LTD., Hyogo (JP)

( * ) Notice: Subject to any disclaimer, the term of this patent is extended or adjusted under 35 U.S.C. 154(b) by 360 days.

(21) Appl. No.: 18/683,638

(22) PCT Filed: Apr. 21, 2023

(86) PCT No.: PCT/JP2023/015865
§ 371 (c)(1),
(2) Date: Feb. 14, 2024

(87) PCT Pub. No.: WO2024/218953
PCT Pub. Date: Oct. 24, 2024

(65) Prior Publication Data
US 2026/0125228 A1     May 7, 2026

(51) Int. Cl.
*B65G 47/90*          (2006.01)
(52) U.S. Cl.
CPC ................................... *B65G 47/90* (2013.01)
(58) Field of Classification Search
None
See application file for complete search history.

(56) References Cited

U.S. PATENT DOCUMENTS 7,383,935 B2 *   6/2008   Tasma ................... B65G 13/071
                                             198/782
7,681,710 B2 *   3/2010   Kuhn ..................... B65G 47/54
                                             198/370.1

(Continued)

FOREIGN PATENT DOCUMENTS

CN        108657725 A  * 10/2018  ............. B65G 13/06
JP          60071421 A  * 4/1985
(Continued)

OTHER PUBLICATIONS

International Search Report issued in PCT/JP2023/015865; mailed Jun. 13, 2023.
(Continued)

*Primary Examiner* — Gene O Crawford
*Assistant Examiner* — Muhammad Awais
(74) *Attorney, Agent, or Firm* — Studebaker Brackett PLLC

(57)          ABSTRACT

A right angle transfer device of the present invention includes: a first conveyance part that forms a first conveyance surface and conveys, in the one direction, the conveyance object placed on the first conveyance surface; a second conveyance part that forms a second conveyance surface different from the first conveyance surface and conveys, in the other direction, the conveyance object placed on the second conveyance surface; and a movement mechanism that moves the first and second conveyance parts so as to move the first conveyance surface and the second conveyance surface in opposite directions to each other along a normal direction of the first conveyance surface, in which each of the first and second conveyance parts stops the conveyance from start to end of the movement by the movement mechanism, and the first conveyance part includes an obstructing member that obstructs the conveyance of the second conveyance part.

2 Claims, 8 Drawing Sheets

(56)           References Cited

U.S. PATENT DOCUMENTS

| | | | | |
|---|---|---|---|---|
| 8,684,169 | B2 * | 4/2014 | Itoh | B65G 13/10 |
| | | | | 198/597 |
| 9,365,361 | B1 * | 6/2016 | Skarlupka | B65G 47/54 |
| 9,469,486 | B2 * | 10/2016 | German | B65G 47/54 |
| 9,617,083 | B2 * | 4/2017 | Itoh | B65G 47/54 |
| 10,053,300 | B2 * | 8/2018 | Itoh | B65G 15/12 |
| 10,112,782 | B2 * | 10/2018 | Wetters | B65G 13/07 |
| 11,618,637 | B2 * | 4/2023 | Cassisi | B65G 47/244 |
| | | | | 198/370.03 |
| 2002/0092734 | A1 * | 7/2002 | Troupos | B65G 47/54 |
| | | | | 198/370.1 |
| 2002/0108839 | A1 * | 8/2002 | Baker | B65G 47/54 |
| | | | | 198/781.03 |
| 2003/0111320 | A1 * | 6/2003 | van Leeuwen | B65G 15/105 |
| | | | | 198/370.06 |
| 2012/0048678 | A1 | 3/2012 | Itoh et al. | |
| 2015/0210484 | A1 | 7/2015 | Itoh et al. | |
| 2017/0001811 | A1 | 1/2017 | Itoh et al. | |
| 2018/0229937 | A1 * | 8/2018 | Itoh | B65G 17/48 |
| 2018/0319605 | A1 | 11/2018 | Itoh et al. | |
| 2022/0289499 | A1 | 9/2022 | Cassisi et al. | |

FOREIGN PATENT DOCUMENTS

| | | | | |
|---|---|---|---|---|
| JP | S60-071421 A | | 4/1985 | |
| JP | H06115679 A | * | 4/1994 | |
| JP | 2014152025 A | * | 8/2014 | |
| JP | 5725768 B2 | * | 5/2015 | |
| JP | 6304486 B2 | | 4/2018 | |
| KR | 101866402 B1 | * | 6/2018 | B65G 15/60 |
| WO | WO-2022116861 A1 | * | 6/2022 | B65G 13/10 |

OTHER PUBLICATIONS

The extended European search report issued by the European Patent Office on Oct. 16, 2024, which corresponds to European Patent Application No. 23847856.4-1017 and is related to U.S. Appl. No. 18/683,638.

* cited by examiner

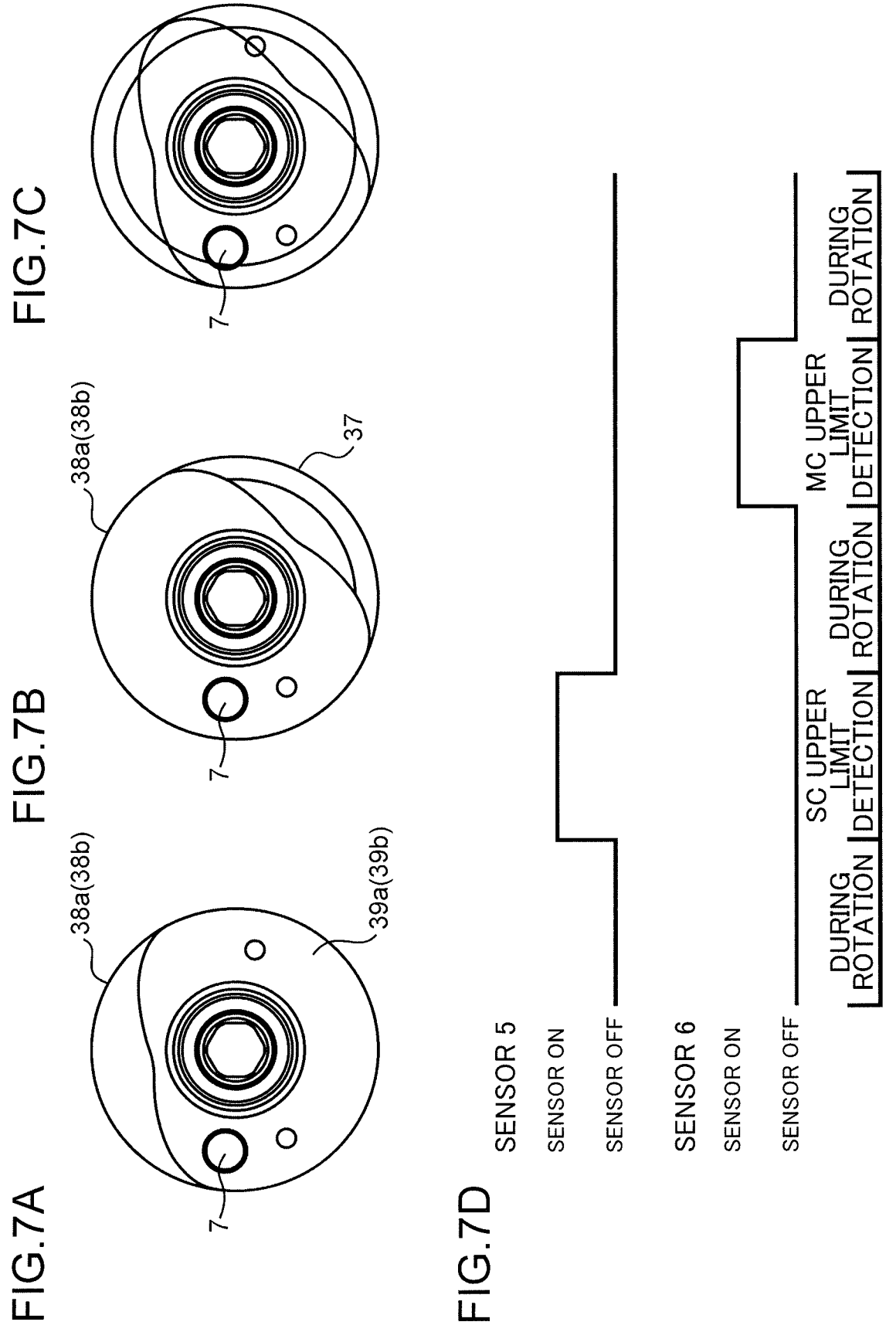

RM

RM

RM

RM

DSb

DSb

DSa

DSa

Ob

Ob

CONVEYANCE OBJECT

CONVEYANCE OBJECT

MAIN LINE CONVEYANCE (CONVEYANCE IN ONE DIRECTION)

MAIN LINE CONVEYANCE (CONVEYANCE IN ONE DIRECTION)

MAIN LINE CONVEYANCE

BRANCH CONVEYANCE (CONVEYANCE IN OTHER DIRECTION)

BRANCH CONVEYANCE

CONTROLLER

CONTROLLER

CL

CL 17  21  37  DSa DSb 17  21  37  DSa DSb

5

6

5

6

RIGHT ANGLE TRANSFER DEVICE

TECHNICAL FIELD

The present invention relates to a right angle transfer device used in a conveyor device and capable of conveying a conveyance object in orthogonal two directions.

BACKGROUND ART

Conveyor devices are frequently used for moving (conveying) conveyance objects, for example, in production sites, distribution sites, and the like. The conveyor devices are roughly classified into a roller conveyor device and a belt conveyor device. The roller conveyor device is a device that includes a plurality of rollers arranged side by side along one direction, and conveys a conveyance object on the plurality of rollers as a conveyance path. The belt conveyor device includes a plurality of rollers arranged side by side along one direction, and a conveyance belt stretched around the plurality of rollers, and conveys a conveyance object on the conveyance belt as a conveyance path. Such a conveyor device is often configured to include a first conveyor part extending in one direction and a second conveyor part extending in another direction different from the one direction in order to convey conveyance objects to various conveyance destinations. The number of the second conveyor parts may be one or more with respect to the first conveyor part. In this case, in order to transfer a conveyance object between the first and second conveyor parts, a transfer device capable of conveying the conveyance object in two directions of the one direction and the other direction is arranged at a location where the one direction and the other direction intersect. Such a transfer device is disclosed in, for example, Patent Literature 1 and Patent Literature 2.

The transfer device disclosed in Patent Literature 1 includes a main conveyance part, a sub conveyance part, and a lift means that lifts at least one of the main conveyance part and the sub conveyance part. The lift means includes a motor. The main conveyance part is provided with a plurality of main conveyance bodies that rotate or travel in contact with a conveyed object and send out the conveyed object in a certain direction. The sub conveyance part is provided with a plurality of sub conveyance bodies that rotate or travel in contact with the conveyed object and send out the conveyed object in a direction intersecting with respect to a conveyance direction of the main conveyance part. The main conveyance part and the sub conveyance part are arranged in an identical plane region. The transfer device conveys the conveyed object in a desired direction by the lift means raising one conveyance part higher than the other conveyance part. In the transfer device, a planar arrangement position of the motor is a planar region overlapping with the main conveyance part and the sub conveyance part. An arrangement position in a height direction of the motor is a position where a part or the entirety of the motor is higher than a height of a lower end of a rotation trajectory or a travel trajectory of any conveyance body in a state where any conveyance part descends. A conveyance body of one conveyance part is a rotation body including a roller or a small rotation body group arranged coaxially. A conveyance body of the other conveyance part is a narrow conveyor having a narrow width. The rotation bodies are arranged in parallel at regular intervals. The narrow conveyor is present between rotation bodies and appears from between the rotation bodies. An arrangement position in the height direction of a part or the entirety of the motor is higher than a height of a lowermost end of the rotation body.

The transfer device disclosed in Patent Literature 2 is a transfer device including a main conveyor part that forms a part of a conveyor device and is capable of placing a conveyed object on a conveyance surface and conveying the conveyed object in a direction along a main conveyance path of the conveyor device, a sub conveyor part that is arranged in a region identical to the main conveyor part and is capable of placing the conveyed object on the conveyance surface and conveying the conveyed object in a direction intersecting a conveyance direction of the main conveyor part, and a lift means that lifts both the main conveyor part and the sub conveyor part. In the transfer device, when the conveyed object to be conveyed along the main conveyance path of the conveyor device approaches the transfer device, the conveyance surface of the main conveyor part is brought into a state of being moved higher than the conveyance surface of the sub conveyor part. When the conveyed object to be discharged from the main conveyance path of the conveyor device approaches the transfer device or reaches on the transfer device, the conveyance surface of the sub conveyor part is brought into a state of being moved to a height equal to or higher than the height of the conveyance surface of the main conveyor part. The sub conveyor part is caused to perform a conveyance operation while the conveyed object to be discharged from the main conveyance path is moving on the conveyance surface of the sub conveyor part in a direction along the main conveyance path while maintaining an inertial force, and the sub conveyor part applies the conveyed object with a force in a direction intersecting the inertial force, and discharges the conveyed object from the main conveyance path.

The transfer device disclosed in Patent Literature 2 changes the conveyance direction without completely stopping the conveyance object on the transfer device in order to quickly change the conveyance direction. For this reason, there is a possibility that the attitude of the conveyance object collapses during transfer or the conveyance object is caught by the sub conveyor part, and there is a possibility of failing to appropriately transfer.

CITATION LIST

Patent Literature

Patent Literature 1: Japanese Patent No. 6304486
Patent Literature 2: Japanese Patent No. 5725768

SUMMARY OF INVENTION

The present invention has been made in view of the above circumstances, and an object of the present invention is to provide a right angle transfer device that enables more appropriate transfer.

A right angle transfer device according to the present invention includes: a first conveyance part that forms a first conveyance surface and conveys, in one direction, the conveyance object placed on the first conveyance surface; a second conveyance part that forms a second conveyance surface different from the first conveyance surface and conveys, in another direction, the conveyance object placed on the second conveyance surface; and a movement mechanism that moves the first and second conveyance parts so as to move the first conveyance surface and the second conveyance surface in opposite directions to each other along a normal direction of the first conveyance surface, in which each of the first and second conveyance parts stops the conveyance from start to end of the movement by the movement mechanism, and the first conveyance part includes an obstructing member that obstructs the conveyance of the second conveyance part.

The above and other objects, features, and advantages of the present invention will become apparent from the following detailed description and the accompanying drawings.

BRIEF DESCRIPTION OF DRAWINGS

FIG. 7 is a view for explaining a detection method for a movement state of first and second conveyance parts in the right angle transfer device.

DESCRIPTION OF EMBODIMENTS

Hereinafter, an embodiment according to the present invention will be described with reference to the drawings. Note that in each drawing, the configuration given an identical reference sign is an identical configuration, and description thereof will be appropriately omitted. Note that in the present description, in a case of collectively referring, a reference sign with a suffix omitted, and in a case of referring to an individual configuration, it is denoted by a reference sign with a suffix.

A right angle transfer device according to the embodiment is a device arranged at a location where one direction and another direction intersect in a conveyor device including a first conveyor part extending in the one direction and a second conveyor part extending in the other direction orthogonal to the one direction, and capable of conveying a conveyance object in two directions of the one direction and the other direction in order to transfer the conveyance object between the first and second conveyor parts. Each of the first and second conveyor parts may be a roller conveyor device, may be a belt conveyor device, or one of the first and second conveyor parts may be a roller conveyor device and the other may be a belt conveyor device. This right angle transfer device includes a first conveyance part, a second conveyance part, and a movement mechanism. The first conveyance part forms a first conveyance surface and conveys, in the one direction, the conveyance object placed on the first conveyance surface. The second conveyance part forms a second conveyance surface different from the first conveyance surface, and conveys, in the other direction, the conveyance object placed on the second conveyance surface. The movement mechanism moves the first and second conveyance parts so as to move the first conveyance surface and the second conveyance surface in opposite directions to each other along a normal direction of the first conveyance surface. Each of the first and second conveyance parts stops the conveyance from start to end of the movement by the movement mechanism, and the first conveyance part includes an obstructing member that obstructs the conveyance of the second conveyance part. Hereinafter, such the right angle transfer device will be described more specifically.

Figures 1A, 1B, 1C, 1D, 1E:
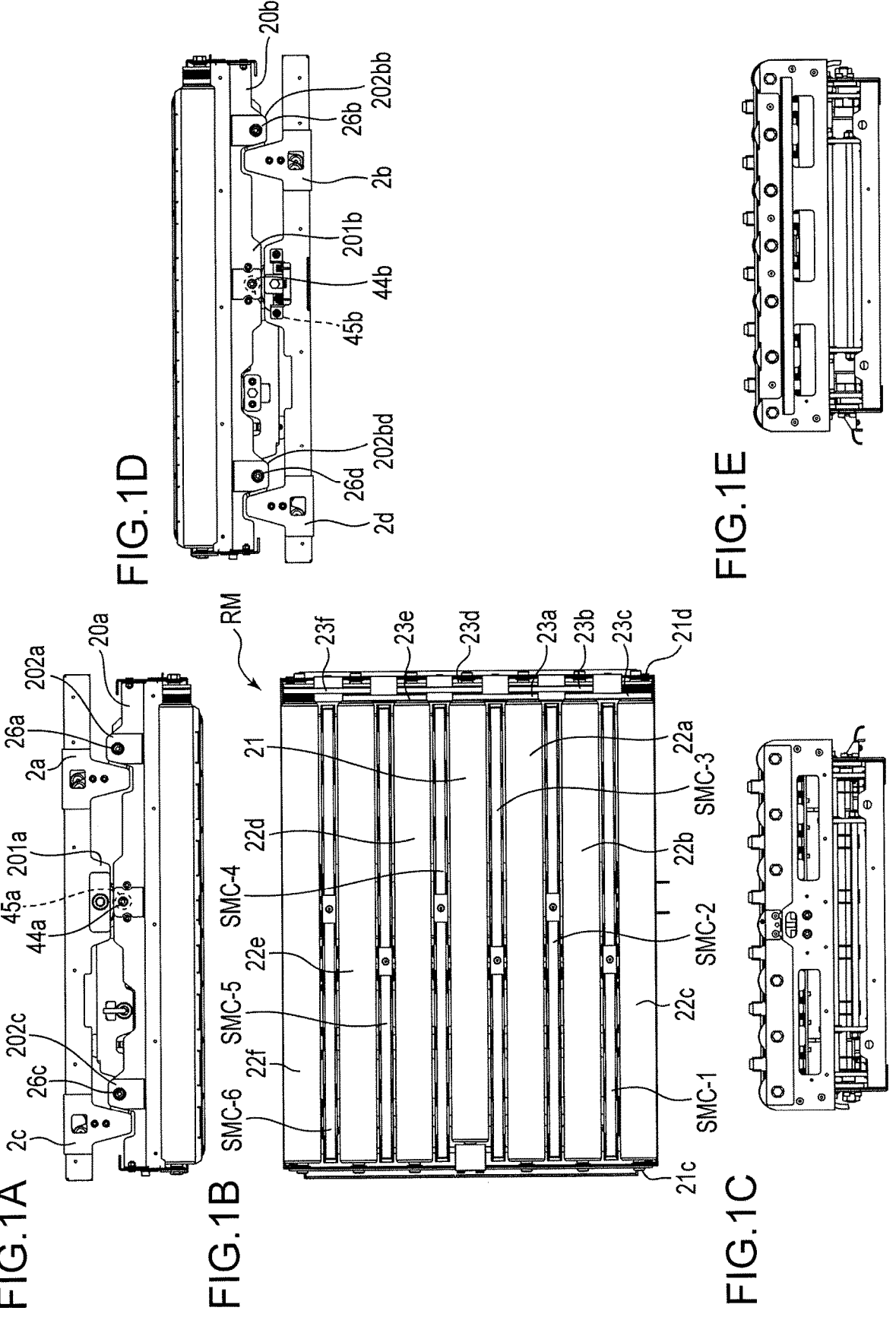
FIG. 1 is a view illustrating a configuration of a right angle transfer device in an embodiment.
Figure 2:
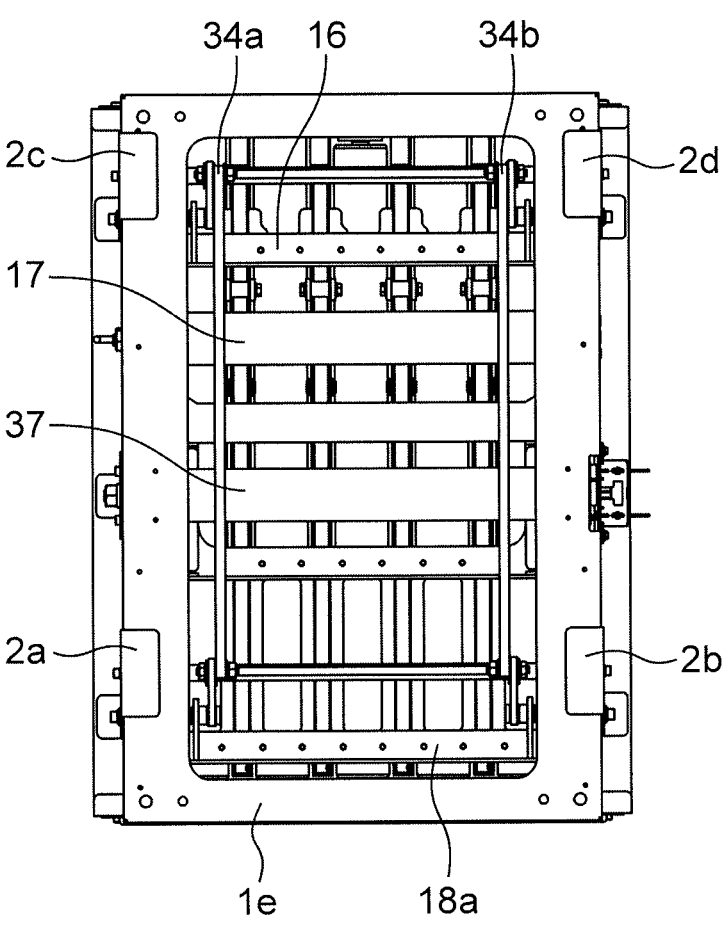
FIG. 2 is a bottom view of the right angle transfer device.
Figure 3:
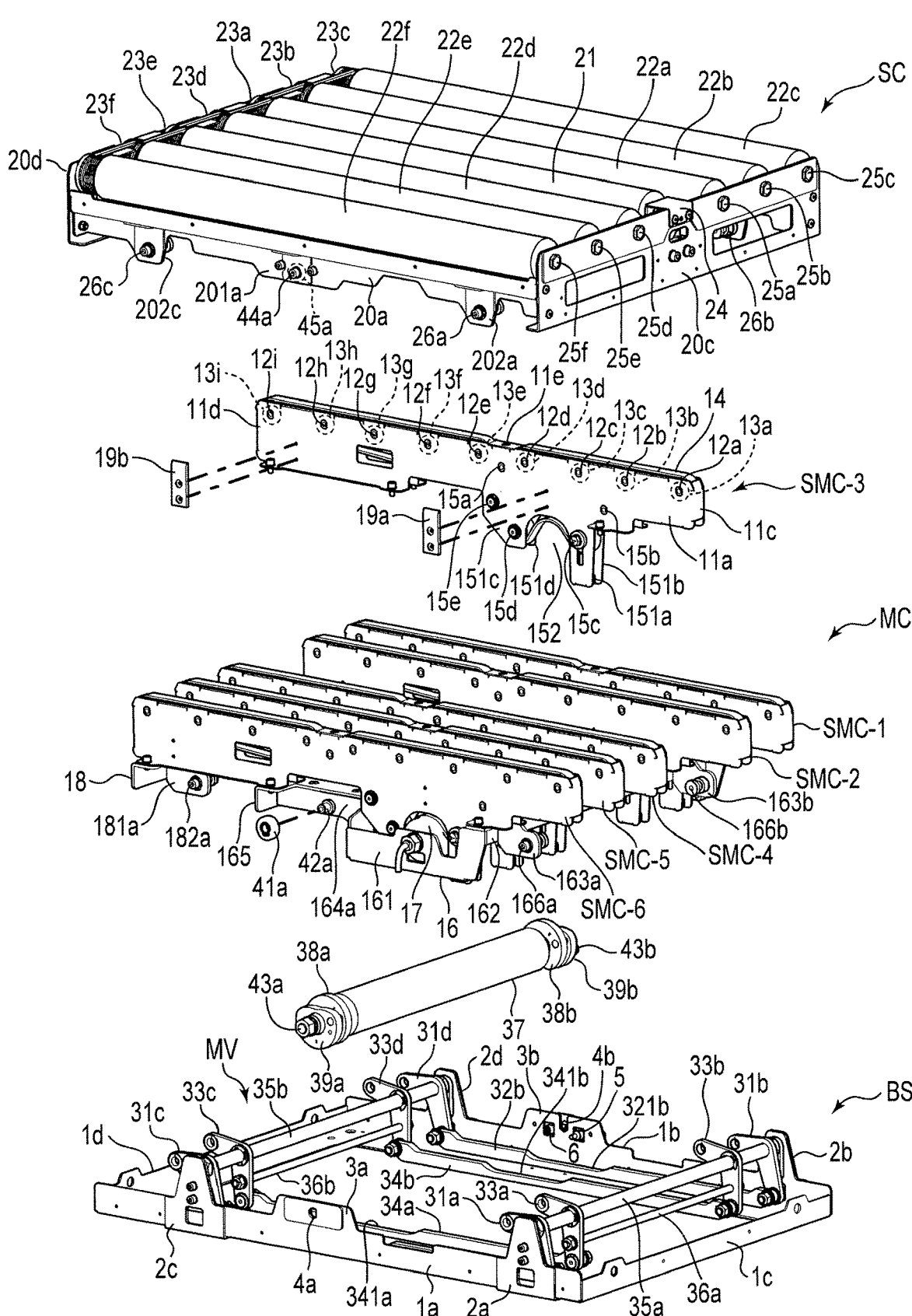
FIG. 3 is an exploded perspective view of the right angle transfer device.
Figure 4:
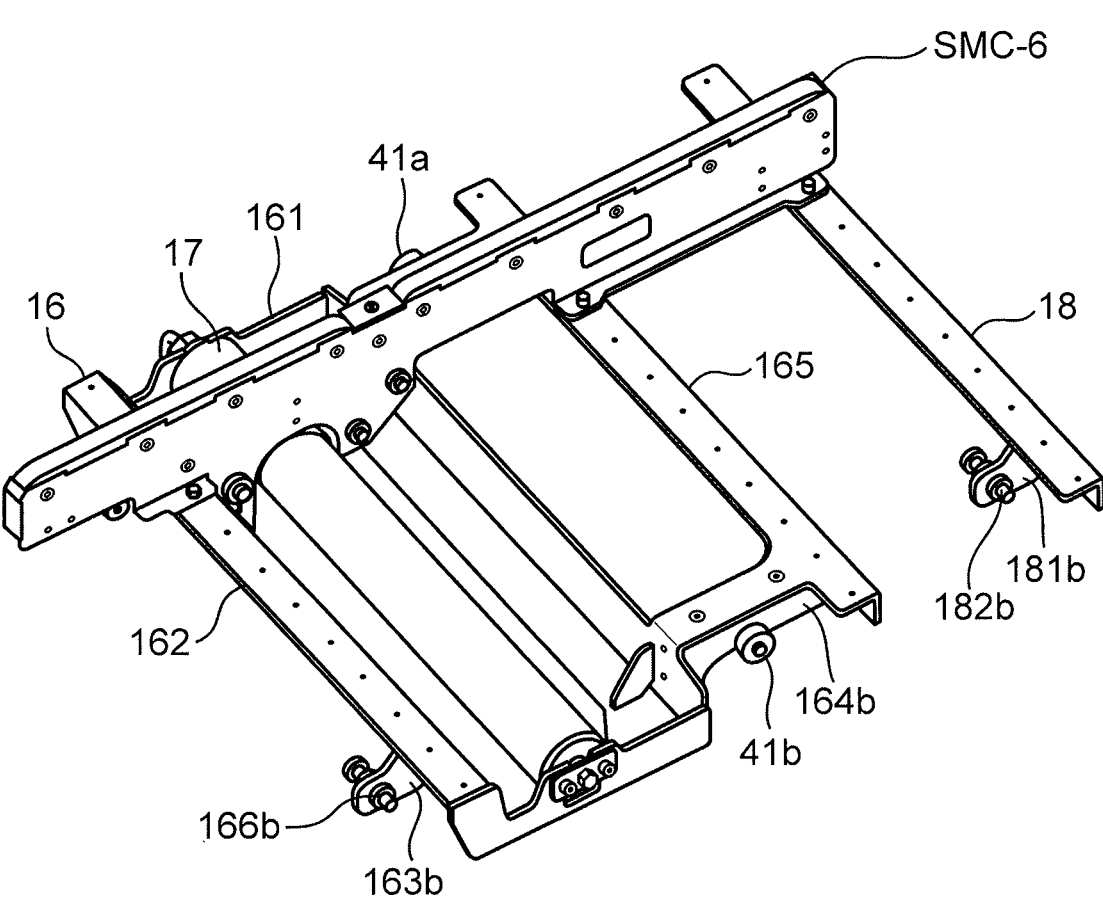
FIG. 4 is a perspective view mainly illustrating a base frame in a first conveyance part of the right angle transfer device.
Figures 5A, 5B, 5C, 5D:
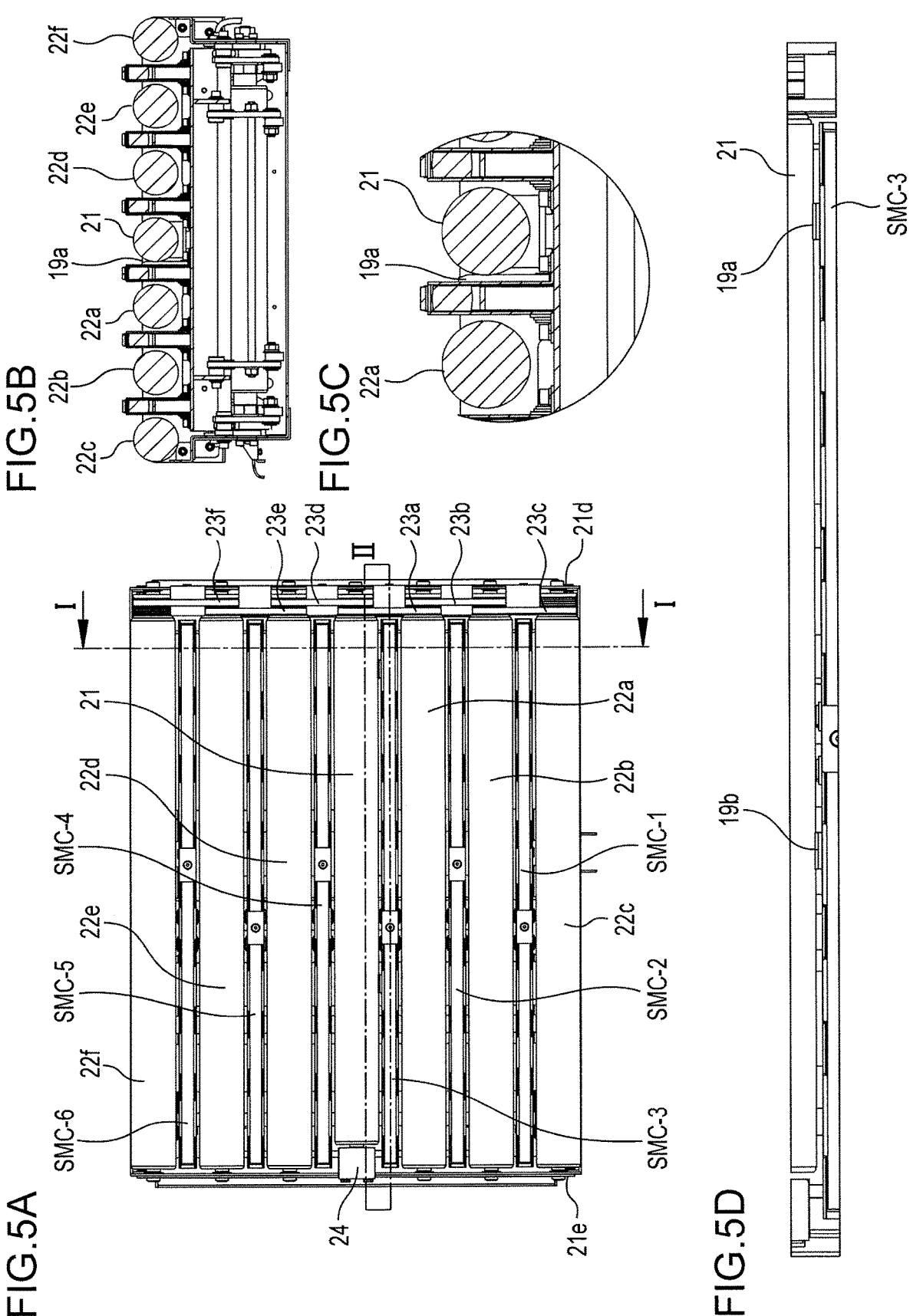
FIG. 5 is a view for explaining a rubber pad of the right angle transfer device.
Figure 6A:
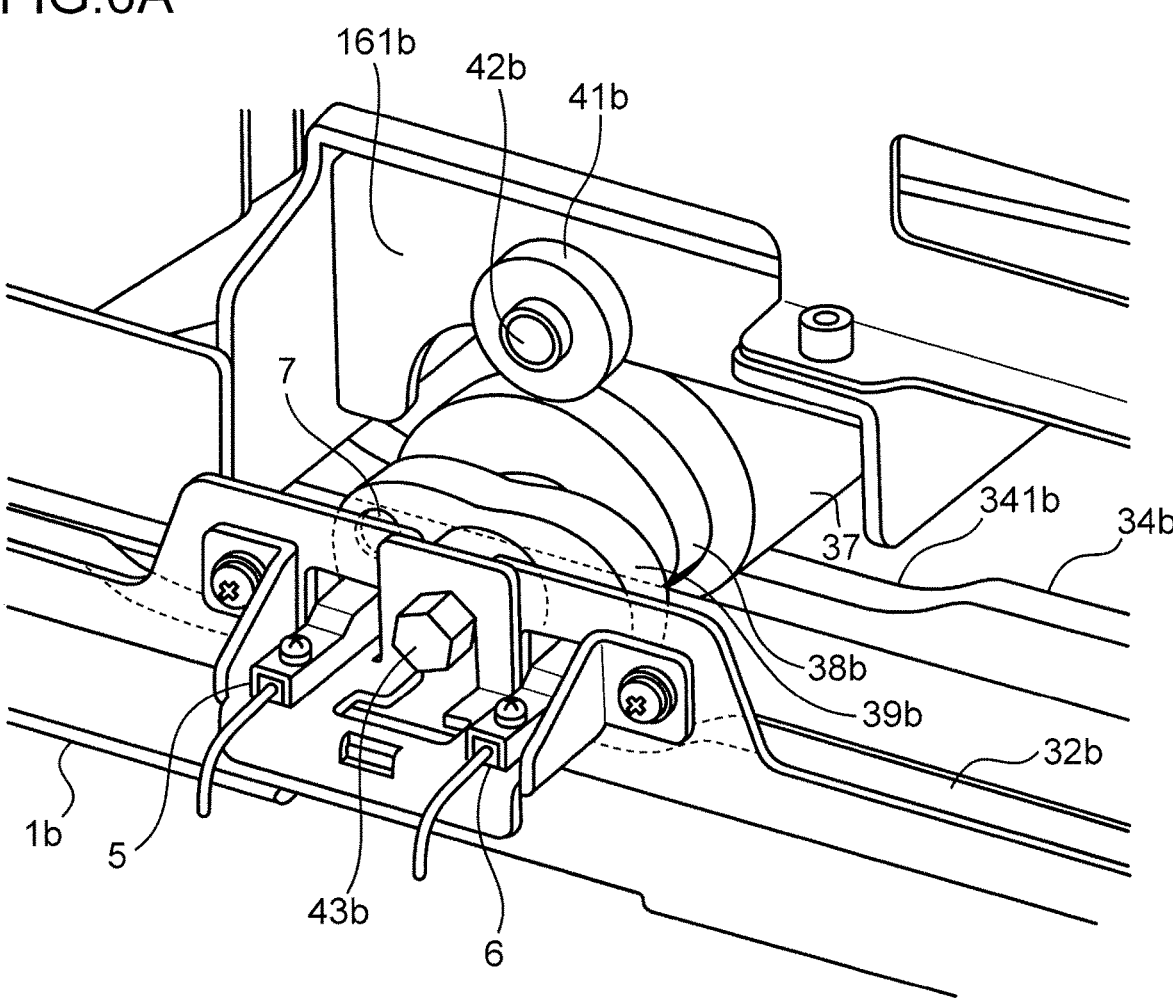
FIG. 6 is a view for explaining a cam mechanism in a belt conveyance unit of the right angle transfer device.
Figure 6B:
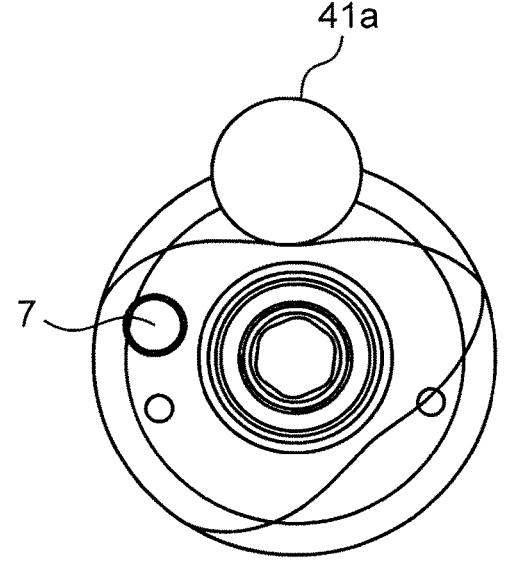

FIG. 1 is a view illustrating the configuration of the right angle transfer device in the embodiment. FIG. 1A is one side view, FIG. 1B is a top view, FIG. 1C is a rear view, FIG. 1D is the other side view, and FIG. 1E is a front view. FIG. 2 is a bottom view of the right angle transfer device. FIG. 3 is an exploded perspective view of the right angle transfer device. FIG. 4 is a perspective view mainly illustrating a base frame in a first conveyance part of the right angle transfer device. Note that FIG. 4 also illustrates one first sub conveyance part SMC-6 and one M roller 17. FIG. 5 is a view for explaining a rubber pad of the right angle transfer device. FIG. 5A is a top view of the right angle transfer device. FIG. 5B is a cross-sectional view taken along line I-I illustrated in FIG. 5A, FIG. 5C is a partially enlarged view of a part surrounded by a circle in FIG. 5B, and FIG. 5D is a partially enlarged view of a part surrounded by a square in FIG. 5A. FIG. 6 is a view for explaining a cam mechanism in a belt conveyance unit of the right angle transfer device. FIG. 6A is a partially enlarged view around the cam mechanism in the right angle transfer device, and FIG. 6B is a view of cams 38a and 39a and a cam follower 41a. Note that FIG. 6B illustrates each of the cams 38a and 39a in a transparent state. FIG. 7 is a view for explaining the detection method for the movement state of the first and second conveyance parts in the right angle transfer device. FIG. 7A illustrates the cam 39a, FIG. 7B illustrates the cam 38a, FIG. 7C is a view of a state where the cam 38a and the cam 39a are each seen through, and FIG. 7D is a time chart of output of each of position detection sensors 5 and 6.

As illustrated in FIGS. 1 to 7, for example, a right angle transfer device RM in the embodiment includes a base part BS, a first conveyance part MC, a second conveyance part SC, and a movement mechanism MV.

The base part BS is a member supporting the first and second conveyance parts MC and SC and the movement mechanism MV. The base part BS includes, for example, a bottom plate member 1e having a rectangular ring shape, and one side plate member 1a, the other side plate member 1b, a front plate member 1c, and a rear plate member 1d that extend from respective sides of the bottom plate member 1e and are erected while being bent at substantially right angles from the respective sides of the bottom plate member 1e. An L shaped cross section improves the mechanical strength of the base part BS. Each of the one side plate member 1a, the other side plate member 1b, the front plate member 1c, and the rear plate member 1d has an elongated plate shape. An attachment member 2a having a substantially L shaped cross section is attached, near the front surface of the one side plate member 1a, to the bottom plate member 1e and the one side plate member 1a on each inner surface of the substantially L shape, and an attachment member 2b having a substantially L shaped cross section is attached, near the front surface of the other side plate member 1b, to the bottom plate member 1e and the other side plate member 1a on each inner surface of the substantially L shape so as to face the attachment member 2a. An attachment member 2c having a substantially L shaped cross section is attached, near the rear surface of the one side plate member 1a, to the bottom plate member 1e and the one side plate member 1a on each inner surface of the substantially L shape, and an attachment member 2d having a substantially L shaped cross section is attached, near the rear surface of the other side plate member 1b, to the bottom plate member 1e and the other side plate member 1b on each inner surface of the substantially L shape so as to face the attachment member 2c. The movement mechanism MV is attached to these four attachment members 2a to 2d as described later. The one side plate member 1a includes a protrusion part 3a extending outward (upward) near the rear surface relative to the center position, and a fastening hole 4a of a through opening is formed in the protrusion part 3a. The other side plate member 1b includes a protrusion part 3b extending outward (upward) near the rear surface relative to the center position so as to face the protrusion part 3a, and a fastening hole 4b of a through opening is formed in the protrusion part 3b so as to face the fastening hole 4a.

The first conveyance part MC is a device that forms a first conveyance surface and conveys, in one direction, a conveyance object Ob (see FIG. 8) placed on the first conveyance surface. The first conveyance part MC will be further described later.

The second conveyance part SC is a device that forms a second conveyance surface different from the first conveyance surface and conveys, in the other direction orthogonal to the one direction, the conveyance object Ob placed on the second conveyance surface. The one direction is a conveyance direction (main conveyance direction, main line conveyance direction) of the first conveyance part MC, and the other direction is a conveyance direction (sub conveyance direction, branch conveyance direction) of the second conveyance part SC. This second conveyance part SC includes a frame, and a plurality of roller tubes arranged side by side in the frame along the other direction and rotatably pivotally supported by the frame, at least one roller tube of the plurality of roller tubes includes a motor that is arranged inside the roller tube and generates a drive force for rotating the roller tube. The second conveyance surface is formed by the plurality of roller tubes. In other words, the second conveyance part SC includes a frame, and a plurality of rollers arranged side by side in the frame along the other direction and rotatably pivotally supported by the frame, at least one roller of the plurality of rollers is a motor-incorporating roller. The second conveyance surface is formed by the plurality of roller tubes (the plurality of rollers). The second conveyance surface is parallel to the first conveyance surface.

More specifically, the second conveyance part SC includes a pair of frame members 20c and 20d arranged so as to face each other at a predetermined interval (third interval) in the one direction and so as to become parallel to each other in the other direction, and coupling members 20a and 20b coupling the pair of frame members 20c and 20d at respective end parts thereof. Each of the pair of frame members 20c and 20d is a rectangular plate-shaped member elongated in the other direction, and the coupling members 20a and 20b are elongated plate-shaped members having a length corresponding to the third interval. The frame member 20c, the coupling member 20b, the frame member 20d, and the coupling member 20a are sequentially coupled at respective end parts in this order to form the frame having a rectangular ring shape. The plurality of rollers rotatably pivotally supported by the frame are arranged side by side in the frame along the other direction, and at least one of the plurality of rollers is a so-called motor-incorporating roller. In the examples illustrated in FIGS. 1 to 7, the second conveyance part SC includes seven rollers 21 and 22a to 22f, the roller 21 positioned at the center position in the other direction is a motor-incorporating roller (motor roller, hereinafter abbreviated as "M roller" as appropriate) 21, and each of three rollers 22a to 22c and 22d to 22f arranged side by side on each of both sides of this M roller 21 are driven rollers (free roller, hereinafter abbreviated as "F roller" as appropriate) 22a to 22f. Note that in the examples illustrated in FIGS. 1 to 7, one M roller 21 exists but a plurality of them may exist. The M roller 21 is a roller rotated by its incorporating motor. The F rollers 22a to 22f are rotatable rollers, and rotate following rotation of the M roller 21.

This M roller 21 includes, for example, a roller tube (M roller tube), a pair of first and second support shafts (M support shafts) that are arranged so as to face each other and rotatably pivotally support the M roller tube at both end parts thereof, and a motor that is arranged inside the M roller tube and generates a drive force for rotating the M roller tube. The motor is fixedly arranged in an inner cylinder fixedly coupled to the first M support shaft, for example, and an output shaft is coupled to a power transmission plate outside the inner cylinder via a speed reducer. The power transmission plate has, for example, a columnar shape, and an outer peripheral side surface thereof is fixedly coupled to an inner peripheral side surface of the M roller tube. Due to this, when the motor rotates, the M roller tube rotates via the speed reducer and the power transmission plate. Of the pair of first and second M support shafts, the first M support shaft to which the inner cylinder is coupled is hollow, a cable for supplying the motor with electric power is inserted, and this supplied electric power is controlled (adjusted), whereby forward rotation, reverse rotation, rotation speed, and the like can be controlled for the motor. Note that the M rollers 17 and 37 described later are configured similarly to the M roller 21.

The F roller FR includes, for example, a roller tube (F roller tube), a pair of first and second support shafts (F support shafts) that are arranged so as to face each other and rotatably pivotally support the F roller tube at both end parts thereof.

In each of the pair of frame members 20c and 20d, a plurality of through openings for inserting the first and second F support shafts of the F rollers 22a to 22f are formed at a predetermined interval (fourth interval) along the other direction. Each of the first and second F support shafts of the F rollers 22a to 22f is inserted into each through opening of the pair of frame members 20c and 20d, and is fixed to each of the pair of frame members 20c and 20d by fixing metal fittings 25a to 25f (fixing metal fitting on the rear surface is not illustrated).

A through opening for inserting the second M support shaft of the M roller 21 is formed at a center position in the other direction of the frame member 20d. An attachment member 24 having a plate shape with a U shaped cross section (shape of E without "-" at the center) for attaching the first M support shaft of the M roller 21 is attached to the center position in the other direction of the frame member 20c, and a through opening for inserting the first M support shaft of the M roller 21 is formed in this attachment member 24. Each of the first and second M support shafts of the M roller 21 is inserted into each of the through opening of the attachment member 24 and the through opening of the frame member 20d, and is fixed to each of the attachment member 24 and the frame member 20d by each fixing metal fitting (not illustrated). The cable of the M roller 21 is drawn out from a space formed by the U shape of the attachment member 24.

The second conveyance surface is formed by each roller tube of these seven M rollers 21 and the F rollers 22a to 22f.

The coupling member 20a includes a protrusion part 201a extending outward (downward) at a substantially center position in the one direction, and a support shaft (C support shaft) 44a is attached to the protrusion part 201a. A cam follower 45a (indicated by a broken line in FIGS. 1 and 3) is attached inside the coupling member 20a in such a manner that it is rotatably pivotally supported by this C support shaft 44a. The coupling member 20a includes protrusion parts 202a and 202c extending outward (downward) at parts near the front surface and the rear surface, respectively, and engagement shafts 26a and 26c that rotatably engage with the movement mechanism MV are attached to these protrusion parts 202a and 202c, respectively, as described later.

Similarly, the coupling member 20b includes a protrusion part 201b extending outward (downward) at a substantially center position in the one direction so as to face the protrusion part 201a, and a C support shaft 44b is attached to the protrusion part 201b. A cam follower 45b (indicated by a broken line in FIGS. 1 and 3) is attached inside the coupling member 20b in such a manner that it is rotatably pivotally supported by this C support shaft 44b. The coupling member 20b includes protrusion parts 202b and 202d extending outward (downward) so as to face the protrusion parts 202a and 202c, respectively, at parts near the front surface and the rear surface, respectively, and engagement shafts 26b and 26d that rotatably engage with the movement mechanism MV are attached to these protrusion parts 202b and 202d, respectively, as described later.

Then, between the rollers 21 and 22a to 22c adjacent to each other in the M roller 21 and the three F rollers 22a to 22c arranged side by side on the other side thereof, respective transmission belts 23a to 23c are wound at the end part on the rear side and sequentially coupled, and when the M roller 21 rotates, the rotation of this M roller 21 is sequentially transmitted to the F rollers 22a to 22c by the respective transmission belts 23a to 23c, and the respective F rollers 22a to 22c rotate. Similarly, between the rollers 21 and 22d to 22f adjacent to each other in the M roller 21 and the three F rollers 22d to 22f arranged side by side on the one side thereof, respective transmission belts 23d to 23f are wound at the end part on the rear side and sequentially coupled, and when the M roller 21 rotates, the rotation of this M roller 21 is sequentially transmitted to the F rollers 22d to 22f by the respective transmission belts 23d to 23f, and the respective F rollers 22d to 22f rotate. Due to this, in the second conveyance part SC, the conveyance object Ob placed on the M roller 21 and the six F rollers 22a to 22f is movable (conveyable) in the other direction.

The first conveyance part MC will be further described. The first conveyance part MC includes a plurality of first sub conveyance parts arranged between the plurality of roller tubes in the second conveyance part SC. In the examples illustrated in FIGS. 1 to 7, the first conveyance part MC includes six first sub conveyance parts SMC-1 to SMC-6, and the first sub conveyance parts SMC-1 to SMC-6 are arranged respectively between the total of seven rollers of the M roller 21 and F rollers 22a to 22f in the second conveyance part SC. The first sub conveyance part includes a plurality of pulleys arranged side by side along the one direction, a conveyance belt stretched around the plurality of pulleys, a support member that supports the plurality of pulleys, and the obstructing member, and the first conveyance part further includes a drive part that drives each conveyance belt in the plurality of first sub conveyance parts. The first conveyance surface is formed by each conveyance belt in the plurality of first sub conveyance parts.

Each of these six first sub conveyance parts SMC has an identical structure except a point of the arrangement position of a coupling member 11e and a point that only the first sub conveyance part SMC-3 includes rubber pads 19a and 19b, and therefore, the first sub conveyance part MSC-3 including the rubber pads 19a and 19b will be described more specifically as a representative. The first sub conveyance part SMC-3 includes a pair of frame members 11a and 11b that face each other at a predetermined interval (first interval) that is narrow in the other direction and are arranged in parallel in the one direction, and coupling members 11c, 11d, and 11e that couple the pair of frame members 11a and 11b at the respective end parts and the respective upper side parts. Each of the pair of frame members 11a and 11b is a rectangular plate-shaped member having a length corresponding to the length of the F roller 22 excluding the part around which a drive belt 23 is wound, and the coupling members 11c, 11d, and 11e are rectangular plate-shaped members having a width corresponding to the first interval, which is narrow. The frame member 11a, the coupling member 11c, the frame member 11b, and the coupling member 11d are sequentially coupled at respective end parts in this order to form a ring shaped frame with a slit shaped gap. The coupling member 11e couples the pair of frame members 11a and 11b at a position near the front surface relative to the center position in the one direction. Here, the first sub conveyance parts SMC-1 and SMC-5 include the coupling member 11e at a position similar to this first sub conveyance part SMC-3, but the first sub conveyance parts SMC-2, SMC-4, and SMC-6 include the coupling member 11e at a position near the rear surface relative to the center position in the one direction.

In each of the pair of frame members 11a and 11b, a plurality of through openings for attaching the support shaft (P support shaft) 12 are formed at a predetermined interval (second interval) along the one direction. In the examples illustrated in FIGS. 1 to 7, nine of the through openings are formed, and the nine P support shafts 12a to 12i are inserted into and attached to these nine through openings, respectively, in the pair of frame members 11a and 11b. The nine P support shafts 12a to 12i rotatably pivotally support nine pulleys 13a to 13i (indicated by broken lines in FIG. 3), respectively, and these nine pulleys 13a to 13i are arranged in the slit shaped gap formed between the pair of frame members 11a and 11b. An endless conveyance belt 14 having a width corresponding to the first interval is stretched around these pulleys 13a to 13i so that the surface of the conveyance belt 14 faces the outside. In each of the pair of frame members 11a and 11b, a through opening for attaching the support shaft (S support shaft) 14a is formed around the coupling member 11e, and the S support shaft 14a is inserted through this through opening and attached. The S support shaft 14a rotatably pivotally supports a pulley (tension maintaining pulley) not illustrated for maintaining the tension of the conveyance belt 14, and the tension maintaining pulley is arranged in the slit shaped gap. In the tension maintaining pulley, the conveyance belt 14 is wound around the tension maintaining pulley so as to be away from the surface and toward the surface again. Due to this, the tension of the conveyance belt 14 is maintained.

The frame member 11a includes a pair of protrusion parts 151a and 151c extending outward (downward) at a predetermined interval (fifth interval) in the one direction so as to form a recess 152 having a substantially semicircular shape into which the M roller 17 enters near the front surface relative to the center position in the one direction, and a pair of through openings for attaching a pair of S support shafts 15c and 15d is formed in the pair of protrusion parts 151a and 151c, respectively. Similarly, the frame member 11b includes a pair of protrusion parts 151*b* and 151*d* extending outward (downward) at the fifth interval in the one direction so as to form the recess 152 so as to face the pair of protrusion parts 151*a* and 151*c*, and a pair of through openings for attaching the pair of S support shafts 15*c* and 15*d* is formed in the pair of protrusion parts 151*b* and 151*d*, respectively. The pair of S support shafts 15*c* and 15*d* is inserted into and attached to the pair of through openings in the pair of protrusion parts 151*a* and 151*c* and the pair of through openings in the pair of protrusion parts 151*b* and 151*d*, respectively. Each of the pair of S support shafts 15*c* and 15*d* rotatably pivotally supports a pair of pulleys (power transmission pulleys) not illustrated for transmitting a rotational force of an M roller 37 to the conveyance belt 14 so that the surface of the conveyance belt 14 is along the surface of the M roller 37 so as to be in contact, and the pair of power transmission pulleys is arranged in the slit shaped gap. An S support shaft 15*b* is attached to each of the pair of frame members 11*a* and 11*b* between the P support shaft 12*a* and the S support shaft 15*c* attached around the front surface. The S support shaft 15*b* rotatably pivotally supports a pulley (track adjustment pulley) that adjusts a track of the conveyance belt 14 wound around the pulley 13*a* pivotally supported by the P support shaft 12*a* so as to be directed to the power transmission pulley pivotally supported by the S support shaft 15*c*, and this track adjustment pulley is arranged in the slit shaped gap. An S support shaft 15*e* is attached to each of the pair of frame members 11*a* and 11*b* between the P support shaft 12*i* and the S support shaft 15*d* attached around the rear surface. The S support shaft 15*e* rotatably pivotally supports a track adjustment pulley that adjusts a track of the conveyance belt 14 wound around the pulley 13*i* pivotally supported by the P support shaft 12*i* so as to be directed to the power transmission pulley pivotally supported by the S support shaft 15*d*, and this track adjustment pulley is arranged in the slit shaped gap.

The conveyance belt 14 is sequentially stretched around the pulleys 13*a* to 13*d*, wound around the tension maintaining pulley, sequentially stretched around the pulleys 13*e* to 13*t*, wound around the track adjustment pulley pivotally supported by the S support shaft 15*e*, wound around the power transmission pulley pivotally supported by the S support shaft 15*d*, along the surface of the M roller 17 in contact, wound around the power transmission pulley pivotally supported by the S support shaft 15*c*, wound around the track adjustment pulley pivotally supported by the S support shaft 15*b*, and stretched around the pulley 13*a*. The conveyance belt 14 has such track, the rotational force of the M roller 17 is transmitted as a drive force of the conveyance belt 14 by a frictional force acting between the surface of the M roller 17 and the surface of the conveyance belt 14, and the conveyance belt 14 moves along the track. The conveyance belt 14 faces the outside at a part stretched between the pulleys 13*a* to 13*i*.

The pair of rubber pads 19*a* and 19*b* is attached to the outer surface of the frame member 11*a* at a predetermined interval (sixth interval) in the one direction. More specifically, each of the pair of rubber pads 19*a* and 19*b* has a rectangular plate shape having a taper becoming thinner toward the tip end, the rubber pad 19*a* is attached around the recess 152, and the rubber pad 19*b* is attached around the rear surface. These rubber pads 19*a* and 19*b* correspond to an example of the obstructing member that obstructs the conveyance of the second conveyance part, and are arranged on the pair of frame members 11*a* and 11*b*, respectively, so as to obstruct rotation of each of the plurality of roller tubes in the second conveyance part SC when the conveyance object Ob can be conveyed on the first conveyance surface and the conveyance object Ob cannot be conveyed on the second conveyance surface. More specifically, as illustrated in FIGS. 5B and 5C, for example, when the first conveyance surface of the first conveyance part MC is positioned at a predetermined upper limit position as described later and the second conveyance surface of the second conveyance part SC is positioned at a predetermined lower limit position, the rubber pad 19*a* is formed with a thickness and elasticity with which the M roller 21 in the second conveyance part SC comes into contact with the rubber pad 19*a* and is further pressed, and is arranged on the frame member 11*a* of the first sub conveyance part SMC-3. The same applies to the rubber pad 19*b*.

Note that in the examples illustrated in FIGS. 1 to 7, as described above, the rubber pads 19*a* and 19*b* are included only in the first sub conveyance part SMC-3 adjacent in the other direction to the M roller 21, and are not included in the remaining first sub conveyance parts SMC-1, SMC-2, and SMC-4 to SMC-6. However, a pair of rubber pads similar to the rubber pads 19*a* and 19*b* may be included in one or a plurality of the remaining first sub conveyance parts SMC-1, SMC-2, and SMC-4 to SMC-6.

The six first sub conveyance parts SMC-1 to SMC-6 having such configuration are arranged on a base member 16 at the first interval in the other direction, and are supported by the base member 16. More specifically, as illustrated in FIG. 4, for example, the base member 16 includes a first sub base member 161 having a plate shape bent in a substantially U shape, a second sub base member 162 elongated in the other direction having a substantially L shaped cross section and coupling tip end parts of the first base member 161 having a substantially U shape, a pair of attachment members 163*a* and 163*b* having a plate shape attached to the second sub base member 162 so as to protrude toward the front surface side along the one direction at a predetermined interval (seventh interval) in the other direction, a pair of attachment members 164*a* and 164*b* having a plate shape attached to the first sub base member 161 so as to protrude toward the rear surface side along the one direction at a predetermined interval (eighth interval) in the other direction at a coupling part of the first sub base member 161 having a substantially U shape, a third sub base member 165 having a substantially U shape attached with each of the pair of attachment members 164*a* and 164*b*. These first sub conveyance parts SMC-1 to SMC-6 are attached to the first and third sub base members 162 and 163 at a predetermined interval (ninth interval) in the other direction so as to be arranged respectively between the total of seven of the M roller 21 and the F rollers 22*a* to 22*f* in the second conveyance part SC, and in this case, the M roller 17 is attached to each arm part extending in the one direction of the first sub base member 161 having a substantially U shape so that the M roller 17 enters the recess 152 in each of the first sub conveyance parts SMC-1 to SMC-6. Due to this, when the M roller 17 rotates, the conveyance belt 14 in each of the first sub conveyance parts SMC-1 to SMC-6 is driven, and the first conveyance surface is formed on each surface facing the outside of the conveyance belt 14 of each of the first sub conveyance parts SMC-1 to SMC-6. Engagement shafts 166*a* and 166*b* that rotatably engage with the movement mechanism MV are attached to the pair of attachment members 163*a* and 163*b*, respectively, as described later. C support shafts 42*a* and 42*b* are attached to a substantially center position of the pair of attachment members 164*a* and 164*b*, respectively. The cam followers 41*a* and 41*b* are attached in such a manner that they are rotatably pivotally supported by these C support shafts 42a and 42b, respectively.

Each of the first sub conveyance parts SMC-1 to SMC-6 is further attached to an auxiliary sub base member 18 having a plate shape elongated in the other direction and having a substantially L shaped cross section on the rear surface side. A pair of attachment members 181a and 181b having a plate shape is attached to this auxiliary sub base member 18 so as to protrude toward the front surface side along the one direction at the seventh interval in the other direction. Engagement shafts 182a and 182b that rotatably engage with the movement mechanism MV are attached to the pair of attachment members 181a and 181b, respectively, as described later.

The movement mechanism MV is a device that moves the first and second conveyance parts so as to move on the first conveyance surface and the second conveyance surface in opposite directions to each other along the normal direction of the first conveyance surface. The movement mechanism MV includes a first link mechanism connected to the first conveyance part, a second link mechanism connected to the second conveyance part, a cam mechanism that is engaged with each of the first and second link mechanisms and moves on the first and second conveyance parts so as to move the first conveyance surface and the second conveyance surface in opposite directions to each other via the first and second link mechanisms, and a drive part that drives the cam mechanism. As described above, the first conveyance surface and the second conveyance surface are parallel to each other, and thus the normal direction of the first conveyance surface is also the normal direction of the second conveyance surface.

More specifically, the movement mechanism MV includes four first links 33a to 33d connected to the first conveyance part MC. Each of these four first links 33a to 33d is a member having a substantially L shaped plate shape. A through opening is formed in each one end part of the first links 33a and 33b having a substantially L shape, and the pair of engagement shafts 166a and 166b in the first conveyance part MC is inserted into the respective through openings and rotatably engaged with the movement mechanism MV and connected. Similarly, a through opening is formed in each one end part of the first links 33c and 33d having a substantially L shape, and the pair of engagement shafts 182a and 182b in the first conveyance part MC is inserted into the respective through openings and rotatably engaged with the movement mechanism MV and connected.

One end part of a second link 34a, which is a plate shaped member elongated in the one direction, is rotatably coupled to the other end part in the first link 33a having a substantially L shape, and the other end part of the second link 34a is rotatably coupled to the other end part in the first link 33c having a substantially L shape. Similarly, one end part of a second link 34b, which is a plate shaped member elongated in the one direction, is rotatably coupled to the other end part in the first link 33b having a substantially L shape, and the other end part of the second link 34b is rotatably coupled to the other end part of the first link 33d having a substantially L shape.

The movement mechanism MV includes four third links 31a to 31d connected to the second conveyance part SC. Each of these four third links 31a to 31d is a member having a substantially L shaped plate shape. A through opening is formed in each one end part of the third links 31a and 31b having a substantially L shape, and the pair of engagement shafts 26a and 26b in the second conveyance part SC is inserted into the respective through openings and rotatably engaged with the movement mechanism MV and connected. Similarly, a through opening is formed in each one end part of the third links 31c and 31d having a substantially L shape, and the pair of engagement shafts 26c and 26d in the second conveyance part SC is inserted into the respective through openings and rotatably engaged with the movement mechanism MV and connected.

One end part of a fourth link 32a, which is a plate shaped member elongated in the one direction, is rotatably coupled to the other end part in the third link 31a having a substantially L shape, and the other end part of the fourth link 32a is rotatably coupled to the other end part in the third link 31c having a substantially L shape. Similarly, one end part of a fourth link 32b, which is a plate shaped member elongated in the one direction, is rotatably coupled to the other end part in the third link 31b having a substantially L shape, and the other end part of the fourth link 32b is rotatably coupled to the other end part in the third link 31d having a substantially L shape.

In each of the first links 33a and 33b and the third links 31a and 31b, each through opening is formed in each bent part. A rotation shaft 35a, which is a member having a columnar (or cylindrical) shape extending in the other direction, is sequentially inserted through respective through openings in the third link 31a, the first link 33a, the first link 33b, and the third link 31b in this order, and is attached to the attachment members 2a and 2b at both end parts of the rotation shaft 35a. Similarly, in each of the first links 33c and 33d and the third links 31c and 31d, each through opening is formed in each bent part. A rotation shaft 35b, which is a member having a columnar (or cylindrical) shape extending in the other direction, is sequentially inserted through respective through openings in the third link 31c, the first link 33c, the first link 33d, and the third link 31d in this order, and is attached to the attachment members 2c and 2d at both end parts of the rotation shaft 35b. Due to this, the movement mechanism MV is attached to the base part BS. A support member 36a, which is a member having a columnar (or cylindrical) shape extending in the other direction, is attached at each of both end parts thereof between the first links 33a and 33b. Similarly, a support member 36b, which is a member having a columnar (or cylindrical) shape extending in the other direction, is attached at each of both end parts thereof between the first links 33c and 33d.

The movement mechanism MV includes the M roller 37. At one end part of the M roller 37, a cam 38a and a cam 39a are sequentially attached coaxially (concentrically) with an M support shaft 43a of the M roller 37 in this order from the inside to the outside so as to rotate with rotation of the M roller 37. Similarly, at the other end part of the M roller 37, a cam 38b and a cam 39b are sequentially attached coaxially (concentrically) with an M support shaft 43b of the M roller 37 in this order from the inside to the outside so as to rotate with rotation of the M roller 37. The M support shafts 43a and 43b of the M roller 37 are fixed to the fastening holes 4a and 4b of the base part BS, respectively.

As illustrated in FIGS. 7A and 7B, for example, the cams 38a, 38b, 39a, and 39b have the identical configuration with an identical size and shape to one another, and have a shape in which a part of a circular plate is cut out so as to become substantially flat so as to leave the center. The surface of a cutout part is not completely flat, and a raised part is formed on each of both sides of a bottom so as to form the bottom above the center. The cam 38a and the cam 39a are fixed to the one end part of the M roller 37 with the cutout part of the cam 38*a* and the cutout part of the cam 39*a* made different from each other as illustrated in FIG. 7C, for example, so as to move on the first conveyance surface of the first conveyance part MC and the second conveyance surface of the second conveyance part SC in opposite directions to each other, so that the second conveyance surface is positioned at a predetermined lower limit position when the first conveyance surface is positioned at a predetermined upper limit position, and so that the second conveyance surface is positioned at the upper limit position when the first conveyance surface is positioned at the lower limit position. Similarly, the cam 38*b* and the cam 39*b* are fixed to the other end part of the M roller 37 with the cutout part of the cam 38*b* and the cutout part of the cam 39*b* made different from each other, so as to move on the first conveyance surface of the first conveyance part MC and the second conveyance surface of the second conveyance part SC in opposite directions to each other, so that the second conveyance surface is positioned at a predetermined lower limit position when the first conveyance surface is positioned at a predetermined upper limit position, and so that the second conveyance surface is positioned at the upper limit position when the first conveyance surface is positioned at the lower limit position. As illustrated in FIG. 6, for example, the cam 38*a* comes into contact with the outer peripheral surface of the cam follower 41*a* rotatably pivotally supported by the C support shaft 42*a* to the first conveyance part MC on the outer peripheral surface thereof. Similarly, the cam 38*b* comes into contact with the outer peripheral surface of the cam follower 41*b* rotatably pivotally supported by the C support shaft 42*b* to the first conveyance part MC on the outer peripheral surface thereof. Similarly, the cam 39*a* comes into contact with the outer peripheral surface of the cam follower 45*a* rotatably pivotally supported by the C support shaft 44*a* to the second conveyance part SC on the outer peripheral surface thereof, and the cam 39*b* comes into contact with the outer peripheral surface of the cam follower 45*b* rotatably pivotally supported by the C support shaft 44*b* to the second conveyance part MC on the outer peripheral surface thereof.

In such the movement mechanism MV, when the M roller 37 rotates, the cams 38*a* and 38*b* and the cams 39*a* and 39*b* also rotate, the cam followers 41*a* and 41*b* of the first conveyance part MC follow the outer peripheral surfaces of the cams 38*a* and 38*b*, whereby the first conveyance part MC moves along the normal direction of the first conveyance surface, and the cam followers 45*a* and 45*b* of the second conveyance part SC follow the outer peripheral surfaces of the cams 39*a* and 39*b*, whereby the second conveyance part SC moves along the normal direction of the first conveyance surface in the direction opposite to the first conveyance part MC. More specifically, when the cam followers 41*a* and 41*b* follow the cutout parts in the cams 38*a* and 38*b*, the first conveyance surface of the first conveyance part MC descends, and when the cam followers 41*a* and 41*b* follow the circular parts that are the remaining parts of the cutout parts in the cams 38*a* and 38*b*, the first conveyance surface of the first conveyance part MC rises. When the cam followers 45*a* and 45*b* follow the cutout parts in the cams 39*a* and 39*b*, the second conveyance surface of the second conveyance part SC descends, and when the cam followers 45*a* and 45*b* follow the circular parts that are the remaining parts of the cutout parts in the cams 39*a* and 39*b*, the second conveyance surface of the second conveyance part SC rises. Here, recesses 341*a* and 341*b* are formed in the second links 34*a* and 34*b*, respectively, so as not to interfere (come into contact) with the cams 38*a* and 38*b*, respectively, during rotation of the cams 38*a* and 38*b*, and similarly, recesses 321*a* and 321*b* are formed in the fourth links 32*a* and 32*b*, respectively, so as not to interfere (come into contact) with the cams 39*a* and 39*b*, respectively, during rotation of the cams 39*a* and 39*b*.

The right angle transfer device RM includes the position detection sensors 5 and 6. The position detection sensor 6 is a sensor that detects the position along the normal direction of the first conveyance surface of the first conveyance surface of the first conveyance part MC, and is, for example, an inductive proximity sensor. As illustrated in FIG. 7, for example, the position detection sensor 6 is attached to the other side plate member 1*b* of the base part BS so as to face the cam 39*b* from the through opening formed on the front surface side of the fastening hole 4*b*. The position detection sensor 5 is a sensor that detects the position along the normal direction (normal direction of the first conveyance surface) of the second conveyance surface of the second conveyance surface of the second conveyance part SC, and is, for example, an inductive proximity sensor. As illustrated in FIG. 7, for example, the position detection sensor 5 is attached to the other side plate member 1*b* of the base part BS so as to face the cam 39*b* from the through opening formed on the rear surface side of the fastening hole 4*b*. In order to actuate the position detection sensors 5 and 6, as illustrated in FIGS. 6, 7A, 7B, and 7C, for example, the cam 38*b* and the cam 39*b* are provided with a dog 7 that is a through opening penetrating both the cam 38*b* and the cam 39*b* at an identical position. This dog 7 is formed so as to face the position detection sensor 6 (face the front) when the first conveyance surface of the first conveyance part MC is positioned at the upper limit position, and so as to face the position detection sensor 5 (face the front) when the second conveyance surface of the second conveyance part SC is positioned at the upper limit position. In a case where the position detection sensors 5 and 6 are inductive proximity sensors, the cams 38*b* and 39*b* are made of metal (including alloy) in order to generate and flow an induced current. In such the position detection sensors 5 and 6, as illustrated in FIG. 7D, for example, when the cam 38*b* and the cam 39*b* are rotated by the M roller 37, the first conveyance surface of the first conveyance part MC is positioned at the upper limit position, and the position detection sensor 6 faces the dog 7, the position detection sensor 5 outputs an OFF signal, and the position detection sensor 6 outputs an ON signal. This makes it possible to detect that the first conveyance surface of the first conveyance part MC is positioned at the upper limit position. In this case, the second conveyance surface of the second conveyance part SC is positioned at the lower limit position. On the other hand, when the cam 38*b* and the cam 39*b* are rotated by the M roller 37, the second conveyance surface of the second conveyance part SC is positioned at the upper limit position, and the position detection sensor 5 faces the dog 7, the position detection sensor 6 outputs an OFF signal, and the position detection sensor 5 outputs an ON signal. This makes it possible to detect that the second conveyance surface of the second conveyance part SC is positioned at the upper limit position. In this case, the first conveyance surface of the first conveyance part MC is positioned at the lower limit position.

The first links 33*a* to 33*d*, the second links 34*a* and 34*b*, and the rotation shafts 35*a* and 35*b* correspond to an example of the first link mechanism connected to the first conveyance part. The third links 31*a* to 31*d*, the fourth links 32*a* and 32*b*, and the rotation shafts 35*a* and 35*b* correspond to an example of the second link mechanism connected to the second conveyance part. The cams 38*a*, 38*b*, 39*a*, and 39*b* and the cam followers 41*a*, 41*b*, 45*a*, and 45*b* paired with them respectively engage with each of the first and second link mechanisms, and correspond to an example of the cam mechanism that moves on the first and second conveyance parts so as to move on the first conveyance surface and the second conveyance surface in opposite directions to each other via the first and second link mechanisms. The M roller 37 corresponds to an example of the drive part that drives the cam mechanism.

The right angle transfer device RM includes a controller CL and a pair of conveyance object detection sensors DSa and DSb (see FIG. 8). The controller CL is a device that is connected to each of the M rollers 17, 21, and 37, the position detection sensors 5 and 6, and the conveyance object detection sensors DSa and DSb, and controls each of the M rollers 17, 21, and 37 based on output of each of the position detection sensors 5 and 6 and output of each of the conveyance object detection sensors DSa and DSb, and is configured to include a computer including, for example, a microprocessor and a peripheral circuit thereof. The controller CL controls the M rollers 17 and 21 of the first and second conveyance parts MC and SC, respectively, so as to stop the conveyance from start to end of the movement by the movement mechanism MV. Each of the conveyance object detection sensors DSa and DSb is a sensor for detecting the conveyance object Ob, and is, for example, a laser range finder or the like that measures a distance to an object. The pair of conveyance object detection sensors DSa and DSb is arranged on a diagonal line of the first and second conveyance surfaces so as to face each other via the first and second conveyance surfaces. The controller CL acquires respective output from the pair of conveyance object detection sensors DSa and DSb at a predetermined sampling interval set in advance.

Figures 8A, 8B, 8C, 8D:
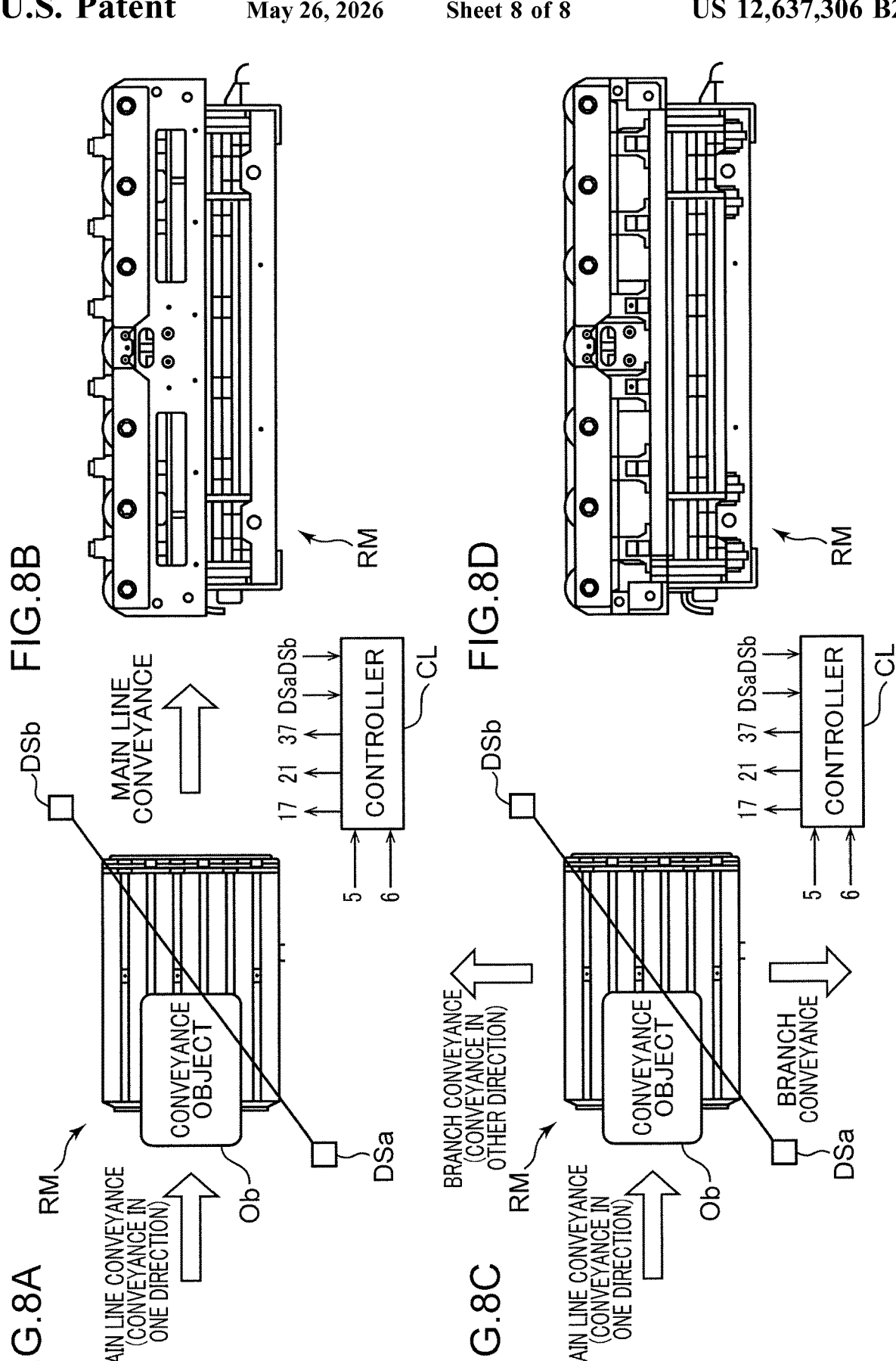
FIG. 8 is a view for explaining an operation of the right angle transfer device.

Next, the operation of the right angle transfer device RM having such configuration will be described. FIG. 8 is a view for explaining the operation of the right angle transfer device. FIG. 8A illustrates a case (case of main line conveyance) where the conveyance object Ob is conveyed in the one direction, FIG. 8B illustrates a scene of the right angle transfer device RM viewed from the one direction in the case illustrated in FIG. 8A, FIG. 8C illustrates a case (case of branch conveyance) where the conveyance object Ob is conveyed in the other direction, and FIG. 8D illustrates a scene of the right angle transfer device RM viewed from the one direction in the case illustrated in FIG. 8C.

In a case of conveying the conveyance object Ob in the one direction, the controller CL rotates the M roller 37, receives the off signal from the position detection sensor 5, and upon receiving the on signal from the position detection sensor 6, stops the rotation of the M roller 37. Due to this, as illustrated in FIG. 8B, the first conveyance surface of the first conveyance part MC is positioned at the upper limit position, and the second conveyance surface of the second conveyance part SC is positioned at the lower limit position. The rotation of the M roller 21 of the second conveyance part SC is obstructed by the rubber pads 19a and 19b of the first conveyance part MC. Then, the controller CL rotates the M roller 17 of the first conveyance part MC. Due to this, each conveyance belt 14 moves, and the conveyance object Ob on each conveyance belt 14 is conveyed in the one direction as illustrated in FIG. 8A.

In a case of conveying the conveyance object Ob from the one direction to the other direction, the controller CL first rotates the M roller 37, receives the off signal from the position detection sensor 5, and upon receiving the on signal from the position detection sensor 6, stops the rotation of the M roller 37. Due to this, similarly to the above, the first conveyance surface of the first conveyance part MC is positioned at the upper limit position, the second conveyance surface of the second conveyance part SC is positioned at the lower limit position, and the rotation of the M roller 21 of the second conveyance part SC is obstructed by the rubber pads 19a and 19b of the first conveyance part MC. Then, the controller CL rotates the M roller 17 of the first conveyance part MC. Due to this, each conveyance belt 14 moves as illustrated in FIG. 8C, and the conveyance object Ob on each conveyance belt 14 is conveyed in the one direction. Subsequently, the controller CL determines whether or not the conveyance object Ob is conveyed and is positioned at a substantially center position (intersection position of two diagonals) of the first and second conveyance surfaces. In this determination, for example, when the distances measured by the pair of conveyance object detection sensors DSa and DSb become substantially identical, the controller CL determines that the conveyance object Ob is positioned at a substantially center position of the first and second conveyance surfaces. More specifically, when the absolute value of a difference between the distances measured by the pair of conveyance object detection sensors DSa and DSb is equal to or less than a preset threshold value (determination threshold value), the controller CL determines that the conveyance object Ob is positioned at a substantially center position of the first and second conveyance surfaces, and when the absolute value exceeds the determination threshold value, the controller CL determines that the conveyance object Ob is not positioned at a substantially center position of the first and second conveyance surfaces. As a result of this determination, when determining that the conveyance object Ob is not positioned at the substantially center position of the first and second conveyance surfaces, the controller CL continues this determination. On the other hand, as a result of this determination, when determining that the conveyance object Ob is positioned at the substantially center position of the first and second conveyance surfaces, the controller CL stops the M roller 17 of the first conveyance part MC in order to stop the conveyance of the conveyance object Ob in the one direction. At this time, the M roller 21 of the second conveyance part SC is also stopped. Therefore, each of the first and second conveyance parts MC and SC stops the conveyance. Subsequently, the controller CL rotates the M roller 37 in order to move the first conveyance surface of the first conveyance part MC and the second conveyance surface of the second conveyance part SC in opposite directions to each other, and stops the rotation of the M roller 37 when the position detection sensor 6 outputs the off signal and the position detection sensor 5 outputs the on signal. Due to this, the second conveyance surface of the second conveyance part SC is positioned at the upper limit position, and the first conveyance surface of the first conveyance part MC is positioned at the lower limit position. Due to this, as illustrated in FIG. 8D, the second conveyance surface of the second conveyance part SC is positioned at the upper limit position, and the first conveyance surface of the first conveyance part MC is positioned at the lower limit position. The M roller 21 of the second conveyance part SC is released from obstruction of rotation by the rubber pads 19a and 19b of the first conveyance part MC. Then, the controller CL rotates the M roller 21 of the second conveyance part MC. Due to this, the M roller 21 and the F rollers 22a to 22f rotate, and the conveyance object Ob on the M roller 21 and the F rollers 22a to 22f is conveyed in the other direction. Therefore, each of the first and second conveyance parts MC and SC stops the conveyance of the conveyance object Ob from start to end of the movement of the first and second conveyance surfaces by the movement mechanism MV.

As described above, in the right angle transfer device RM in the embodiment, each of the first and second conveyance parts MC and SC stops the conveyance from start to end of movement by the movement mechanism MV. Therefore, the possibility that the attitude of the conveyance object Ob collapses during transfer is reduced, and the possibility that the conveyance object Ob is caught by the second conveyor part is reduced, and therefore the right angle transfer device RM enables more appropriate transfer. Since the right angle transfer device RM includes the rubber pads 19*a* and 19*b*, which are examples of the obstructing members, conveyance in the other direction can be obstructed during conveyance of the first conveyor part, and therefore the possibility that the attitude of the conveyance object Ob collapses during conveyance of the first conveyor part is reduced and the possibility that the conveyance object Ob is caught by the second conveyor part is reduced. Therefore, the right angle transfer device enables more appropriate conveyance. Since the right angle transfer device RM stops the conveyance from start to end of movement by the movement mechanism MV, it can be arranged not only at a branch point of branching from the first conveyor part to the second conveyor part but also at a corner point of bending at a right angle from the first conveyor part to the second conveyor part.

Since the right angle transfer device RM can be configured using the M roller and the F roller of the roller conveyor device, the manufacturing cost can be reduced as compared with the case of not using the M roller and the F roller. In particular, since the M roller 17 is used for a power source of the first conveyance part MC and the M roller 37 is used for a power source of the movement mechanism MV, the manufacturing cost can be reduced, and a controller that controls the M roller of the roller conveyor device can be used.

The right angle transfer device RM can achieve the movement of the first and second conveyance parts by one cam mechanism.

Note that in the above embodiment, the conveyance object Ob is detected by the conveyance object detection sensors DSa and DSb of the laser range finder, but the present invention is not limited to this, and the conveyance object Ob may be detected by a camera arranged above (e.g., above the first and second conveyance surfaces on a normal line passing through substantially center positions of the first and second conveyance surfaces, and the like) the right angle transfer device RM, for example. In this case, an image in which the first and second conveyance surfaces are captured in advance by the camera is stored in the controller CL as a background image, and the controller CL generates a difference image that is a difference between the image generated by the camera and the background image. When the conveyance object Ob is present within an imaging range of the camera, since the conveyance object Ob appears in the difference image, the controller CL can determine whether or not the conveyance object Ob is positioned at a substantially center position of the first and second conveyance surfaces at a position in the difference image of the conveyance object Ob appearing in the difference image.

The present description discloses techniques of various aspects as described above, and main techniques thereof are summarized below.

A right angle transfer device according to one aspect is a device arranged at a location where one direction and another direction intersect in a conveyor device including a first conveyor part extending in the one direction and a second conveyor part extending in the other direction orthogonal to the one direction, and capable of conveying a conveyance object in two directions of the one direction and the other direction in order to transfer the conveyance object between the first and second conveyor parts. This right angle transfer device includes: a first conveyance part that forms a first conveyance surface and conveys, in the one direction, the conveyance object placed on the first conveyance surface; a second conveyance part that forms a second conveyance surface different from the first conveyance surface and conveys, in the other direction, the conveyance object placed on the second conveyance surface; and a movement mechanism that moves the first and second conveyance parts so as to move the first conveyance surface and the second conveyance surface in opposite directions to each other along a normal direction of the first conveyance surface, in which each of the first and second conveyance parts stops the conveyance from start to end of the movement by the movement mechanism, and the first conveyance part includes an obstructing member that obstructs the conveyance of the second conveyance part.

In such right angle transfer device, each of the first and second conveyance parts stops the conveyance from start to end of movement by the movement mechanism. Therefore, the possibility that the attitude of the conveyance object collapses during transfer is reduced, and the possibility that the conveyance object is caught by the second conveyor part is reduced, and therefore the right angle transfer device enables more appropriate transfer. Since the right angle transfer device includes the obstructing member, conveyance in the other direction can be obstructed during conveyance of the first conveyor part, and therefore the possibility that the attitude of the conveyance object collapses during the conveyance of the first conveyor part is reduced and the possibility that the conveyance object is caught by the second conveyor part is reduced. Therefore, the right angle transfer device enables more appropriate conveyance.

In another aspect, in the above-described right angle transfer device, the second conveyance part includes a frame, and a plurality of roller tubes arranged side by side in the frame along the other direction and rotatably pivotally supported by the frame, at least one roller tube of the plurality of roller tubes includes a motor that is arranged inside the roller tube and generates a drive force for rotating the roller tube, the first conveyance part includes a plurality of first sub conveyance parts arranged between the plurality of roller tubes, each of the first sub conveyance parts includes a plurality of pulleys arranged side by side along the one direction, a conveyance belt stretched over the plurality of pulleys, a support member supporting the plurality of pulleys, and the obstructing member, the first conveyance part further includes a drive part that drives each conveyance belt in the plurality of first sub conveyance parts, and the obstructing member is arranged on the support member so as to obstruct rotation of each of the plurality of roller tubes in the second conveyance part when the conveyance object is allowed to be conveyed on the first conveyance surface and the conveyance object is not allowed to be conveyed on the second conveyance surface. It is preferable that in the above-described right angle transfer device, the first conveyance surface is formed on a surface of each conveyance belt in the plurality of first sub conveyance parts. It is preferable that in the above-described right angle transfer device, the second conveyance surface is formed on each surface of the plurality of roller tubes. It is preferable that in the above-described right angle transfer device, the obstructing member is a rubber pad. It is preferable that in the above-described right angle transfer device, the drive part of the first conveyance part is a motor roller including a roller tube and a motor that is arranged inside the roller tube and generates a drive force for rotating the roller tube, and drives each of the conveyance belts by bringing a surface of each of the conveyance belts into contact with a surface of the roller tube.

Since such right angle transfer device can be configured using the motor roller and a free roller of the roller conveyor device, the manufacturing cost can be reduced as compared with the case of not using the motor roller and the free roller.

In another aspect, in the above-described right angle transfer device, the movement mechanism includes a first link mechanism connected to the first conveyance part, a second link mechanism connected to the second conveyance part, a cam mechanism that is engaged with each of the first and second link mechanisms and moves on the first and second conveyance parts so as to move the first conveyance surface and the second conveyance surface in opposite directions to each other via the first and second link mechanisms, and a drive part that drives the cam mechanism.

Such right angle transfer device can achieve the movement of the first and second conveyance parts by one cam mechanism.

In order to express the present invention, the present invention has been appropriately and sufficiently described above through the embodiment with reference to the drawings, but it should be recognized that a person skilled in the art can easily change and/or improve the above-described embodiment. Therefore, unless a change form or an improvement form carried out by a person skilled in the art is at a level departing from the scope of the claims described in the claims, the change form or the improvement form is interpreted to be included in the scope of the claims.

INDUSTRIAL APPLICABILITY

According to the present invention, it is possible to provide a right angle transfer device used in a conveyor device and capable of conveying a conveyance object in orthogonal two directions.

The invention claimed is:

1. A right angle transfer device arranged at a location where one direction and another direction intersect in a conveyor device including a first conveyor part extending in the one direction and a second conveyor part extending in the other direction orthogonal to the one direction, and capable of conveying a conveyance object in two directions of the one direction and the other direction in order to transfer the conveyance object between the first and second conveyor parts, the right angle transfer device comprising:
a first conveyance part that forms a first conveyance surface and conveys, in the one direction, the conveyance object placed on the first conveyance surface;

a second conveyance part that forms a second conveyance surface different from the first conveyance surface and conveys, in the other direction, the conveyance object placed on the second conveyance surface; and
a movement mechanism that moves the first and second conveyance parts so as to move the first conveyance surface and the second conveyance surface in opposite directions to each other along a normal direction of the first conveyance surface,
wherein each of the first and second conveyance parts stops the conveyance from start to end of the movement by the movement mechanism,
the first conveyance part includes an obstructing member that obstructs the conveyance of the second conveyance part,
the second conveyance part includes
a frame, and
a plurality of roller tubes arranged side by side in the frame along the other direction and rotatably pivotally supported by the frame,
at least one roller tube of the plurality of roller tubes includes a motor that is arranged inside the roller tube and generates a drive force for rotating the roller tube,
the first conveyance part includes a plurality of first sub conveyance parts arranged between the plurality of roller tubes,
each of the first sub conveyance parts includes a plurality of pulleys arranged side by side along the one direction, a conveyance belt stretched over the plurality of pulleys, a support member supporting the plurality of pulleys, and the obstructing member,
the first conveyance part further includes a drive part that drives each conveyance belt in the plurality of first sub conveyance parts, and
the obstructing member is arranged on the support member so as to obstruct rotation of each of the plurality of roller tubes in the second conveyance part when the conveyance object is allowed to be conveyed on the first conveyance surface and the conveyance object is not allowed to be conveyed on the second conveyance surface.
2. The right angle transfer device according to claim 1, wherein
the movement mechanism includes
a first link mechanism connected to the first conveyance part,
a second link mechanism connected to the second conveyance part,
a cam mechanism that is engaged with each of the first and second link mechanisms and moves on the first and second conveyance parts so as to move the first conveyance surface and the second conveyance surface in opposite directions to each other via the first and second link mechanisms, and
a drive part that drives the cam mechanism.

* * * * *